United States Patent
Mansfield

(10) Patent No.: US 11,750,104 B2
(45) Date of Patent: Sep. 5, 2023

(54) DETERMINING AN INPUT VOLTAGE TO A GALVANIC ISOLATION POINT

(71) Applicant: MICRO MOTION, INC., Boulder, CO (US)

(72) Inventor: William M. Mansfield, Niwot, CO (US)

(73) Assignee: MICRO MOTION, INC., Boulder, CO (US)

( * ) Notice: Subject to any disclaimer, the term of this patent is extended or adjusted under 35 U.S.C. 154(b) by 0 days.

(21) Appl. No.: 17/261,670

(22) PCT Filed: Aug. 3, 2018

(86) PCT No.: PCT/US2018/045203
§ 371 (c)(1),
(2) Date: Jan. 20, 2021

(87) PCT Pub. No.: WO2020/027854
PCT Pub. Date: Feb. 6, 2020

(65) Prior Publication Data
US 2021/0273572 A1    Sep. 2, 2021

(51) Int. Cl.
*H02M 3/335* (2006.01)
*H02M 1/32* (2007.01)

(52) U.S. Cl.
CPC ......... *H02M 3/33592* (2013.01); *H02M 1/32* (2013.01)

(58) Field of Classification Search
CPC ........................... H02M 1/32; H02M 3/33592
See application file for complete search history.

(56) References Cited

U.S. PATENT DOCUMENTS

| | | | |
|---|---|---|---|
| 5,956,238 A | 9/1999 | Wunderlich | |
| 7,200,015 B1 | 4/2007 | Mirskiy | |
| 2015/0162837 A1* | 6/2015 | Duan | H02M 3/337 363/21.14 |
| 2017/0033697 A1 | 2/2017 | Xu | |
| 2017/0155335 A1* | 6/2017 | Chang | H02M 1/36 |

FOREIGN PATENT DOCUMENTS

WO    2014071674 A1    5/2014

* cited by examiner

*Primary Examiner* — Rafael O De León Domenech
(74) *Attorney, Agent, or Firm* — The Ollila Law Group LLC

(57) ABSTRACT

An electronics (100) configured to determine an input voltage to a galvanic isolation point of the electronics (100) is provided. The electronics (100) comprises an isolation transformer (120) configured to conduct a primary current (Ip) provided by an input voltage source (110), and provide a secondary voltage (Vs), the secondary voltage (Vs) being proportional to a primary voltage (Vp) induced by the primary current (Ip). The electronics (100) also comprises a peak detection circuit (130) coupled to the isolation transformer (120), the peak detection circuit (130) being configured to receive the secondary voltage (Vs) and, based on the secondary voltage (Vs), provide a signal that is proportional to the primary voltage (Vp).

16 Claims, 4 Drawing Sheets

DETERMINING AN INPUT VOLTAGE TO A GALVANIC ISOLATION POINT

TECHNICAL FIELD

The embodiments described below relate to electronics including a galvanic isolation point and, more particularly, to determining an input voltage to a galvanic isolation point.

BACKGROUND

In industrial control products communication must occur in potentially hazardous and electrically noisy environments while utilizing limited computation and/or power resources. Because of the potentially hazardous and/or electrically noisy environments in which industrial control products are employed, many products include electrical isolation between input/output (I/O) channels, sensor connection, and/or processing functions. In non-hazardous installations, this isolation is provided to eliminate possible ground loop and noise sources since I/O channels may be directed to different systems. In hazardous area installations, the isolation may be necessary to meet approval standards.

A transformer may be used to electrically isolate an input and an output voltage. The transformer may be part of a DC/DC converter, such as a flyback converter. FIG. 1 shows an exemplary flyback converter 10. As shown in FIG. 1, the flyback converter 10 includes an input voltage source 11 and an isolation transformer 12. The isolation transformer 12 is coupled to the input voltage source 11 and is configured to receive an input voltage Vin provided by the input voltage source 11. The isolation transformer 12 is also coupled to a rectifier circuit 13. The rectifier circuit 13 is comprised of a rectifier diode D1 and an output capacitor Cout. A switch 15 is coupled to the isolation transformer 12 and is configured to allow a current to flow from the input voltage source 11 through the isolation transformer 12.

The isolation transformer 12 serves as a galvanic isolation point. That is, an output voltage provided by the flyback converter 10 may not include noise, transients, high voltage, or the like, that may be induced by current flow between input and output sections that would be possible in the absence of the gavanic isolation point. The flyback converter 10 may be included in an electronics (e.g., an electronic device) that needs to determine the input voltage Vin to ensure that the input voltage Vin is within specification. For example, in a loop powered device, power may be consumed on the secondary or galvanically isolated side of the device's electronics, including measurement transducer(s) and associated signal processing circuitry. The power must be provided by the loop coupled to the input or primary side of the device, which may not be sufficient for the measurement transducer and associated signal processing circuitry.

The electronics may also need to determine the input voltage Vin using circuits on the secondary or galvanically isolated side of the electronics. However, adding an additional galvanic isolation point (e.g., an additional transformer) to transmit a measured value of the input voltage Vin requires additional board space. In addition, significant costs may be incurred in modifying existing electronic designs to incorporate the additional galvanic isolation point that may be avoided if the existing galvanic isolation point can be utilized. Therefore, there is a need to determine the input voltage to the galvanic isolation point without requiring the additional galvanic isolation point.

SUMMARY

An electronics configured to determine an input voltage to a galvanic isolation point of the electronics is provided. According to an embodiment, the electronics comprises an isolation transformer configured to conduct a primary current provided by an input voltage source, and provide a secondary voltage, the secondary voltage being proportional to a primary voltage induced by the primary current. The electronics also comprises a peak detection circuit coupled to the isolation transformer, the peak detection circuit being configured to receive the secondary voltage and, based on the secondary voltage, provide a signal that is proportional to the primary voltage.

A method for determining an input voltage to a galvanic isolation point is provided. According to an embodiment, the method comprises conducting a primary current provided by an input voltage source through an isolation transformer, providing a secondary voltage with the isolation transformer, the secondary voltage being proportional to a primary voltage induced by the primary current, receiving the secondary voltage with a peak detection circuit, and based on the secondary voltage, providing with the peak detection circuit a signal that is proportional to the primary voltage.

Aspects

According to an aspect, an electronics (100) configured to determine an input voltage to a galvanic isolation point of the electronics (100) comprises an isolation transformer (120) configured to conduct a primary current (Ip) provided by an input voltage source (110), and provide a secondary voltage (Vs), the secondary voltage (Vs) being proportional to a primary voltage (Vp) induced by the primary current (Ip). The electronics (100) also comprises a peak detection circuit (130) coupled to the isolation transformer (120), the peak detection circuit (130) being configured to receive the secondary voltage (Vs) and, based on the secondary voltage (Vs), provide a signal that is proportional to the primary voltage (Vp).

Preferably, the electronics (100) further comprises a rectifier circuit (140) coupled to the isolation transformer (120), the rectifier circuit (140) being configured to receive the secondary voltage (Vs) and provide to a load (L) a capacitor voltage when the secondary voltage (Vs) is at a negative value, and the secondary voltage (Vs) when the secondary voltage (Vs) is a positive value.

Preferably, the rectifier circuit (140) is comprised of a rectifier diode (D1) in a series electrical connection with the isolation transformer (120) and configured to provide the secondary voltage (Vs) to the load (L) when the secondary voltage (Vs) is the positive value by conducting a secondary current (Is) provided by the isolation transformer (120). The rectifier circuit (140) is also comprised of an output capacitor (Cout) in a parallel electrical connection with the isolation transformer (120), the output capacitor (Cout) being configured to receive the secondary voltage (Vs) when the rectifier diode (D1) is conducting the secondary current (Is).

Preferably, the rectifier diode (D1) is further configured to prevent a current flow when the secondary voltage (Vs) is at the negative value.

Preferably, the peak detection circuit (130) is further configured to hold a first voltage value of the secondary voltage (Vs) when the secondary voltage (Vs) is at a second voltage value that is greater than the first voltage value.

Preferably, the peak detection circuit (130) is comprised of a peak detect diode (D2) in a series electrical connection with a peak hold capacitor (C1), the peak detection circuit (130) being in a parallel electrical connection with the isolation transformer (120).

Preferably, the peak hold capacitor (C1) is configured to hold the first voltage value of the secondary voltage (Vs) when the secondary voltage (Vs) is at the second voltage value that is greater than the first voltage value, and the peak detect diode (D2) is configured to conduct a current when the second voltage value of the secondary voltage (Vs) is less than the first voltage value.

Preferably, the secondary voltage (Vs) is proportional to the primary voltage (Vp) by a secondary-to-primary turns ratio (Ns/Np) of the isolation transformer (120).

A method for determining an input voltage to a galvanic isolation point comprises conducting a primary current provided by an input voltage source through an isolation transformer, providing a secondary voltage with the isolation transformer, the secondary voltage being proportional to a primary voltage induced by the primary current, receiving the secondary voltage with a peak detection circuit, and based on the secondary voltage, providing with the peak detection circuit a signal that is proportional to the primary voltage.

Preferably, the method further comprises receiving with a rectifier circuit the secondary voltage and providing to a load with a rectifier circuit a capacitor voltage when the secondary voltage is a negative value and the secondary voltage when the secondary voltage is a positive value.

Preferably, providing to the load with the rectifier circuit the capacitor voltage when the secondary voltage is a positive value comprises providing with a rectifier diode in the rectifier circuit in a series electrical connection with the isolation transformer by conducting a secondary current provided by the isolation transformer, and receiving with an output capacitor in a parallel electrical connection with the isolation transformer the secondary voltage when the rectifier diode is conducting the secondary current.

Preferably, the method further comprises preventing current flow with the rectifier diode when the secondary voltage is at the negative value.

Preferably, the method further comprises holding with the peak detection circuit a first voltage value of the secondary voltage when the secondary voltage is at a second voltage value that is greater than the first voltage value.

Preferably, the method further comprises providing a peak detect diode and a peak hold capacitor, and connecting the peak detect diode and the peak hold capacitor in series to comprise the peak detection circuit.

Preferably, the method further comprises holding with the peak hold capacitor the first voltage value when the secondary voltage is at the second voltage value greater than the first voltage value and configuring the peak detect diode to conduct current when the second voltage value is less than the first voltage value.

Preferably, the secondary voltage is proportional to the primary voltage by a secondary-to-primary turns ratio of the isolation transformer.

BRIEF DESCRIPTION OF THE DRAWINGS

The same reference number represents the same element on all drawings. It should be understood that the drawings are not necessarily to scale.

DETAILED DESCRIPTION

Figure 1:
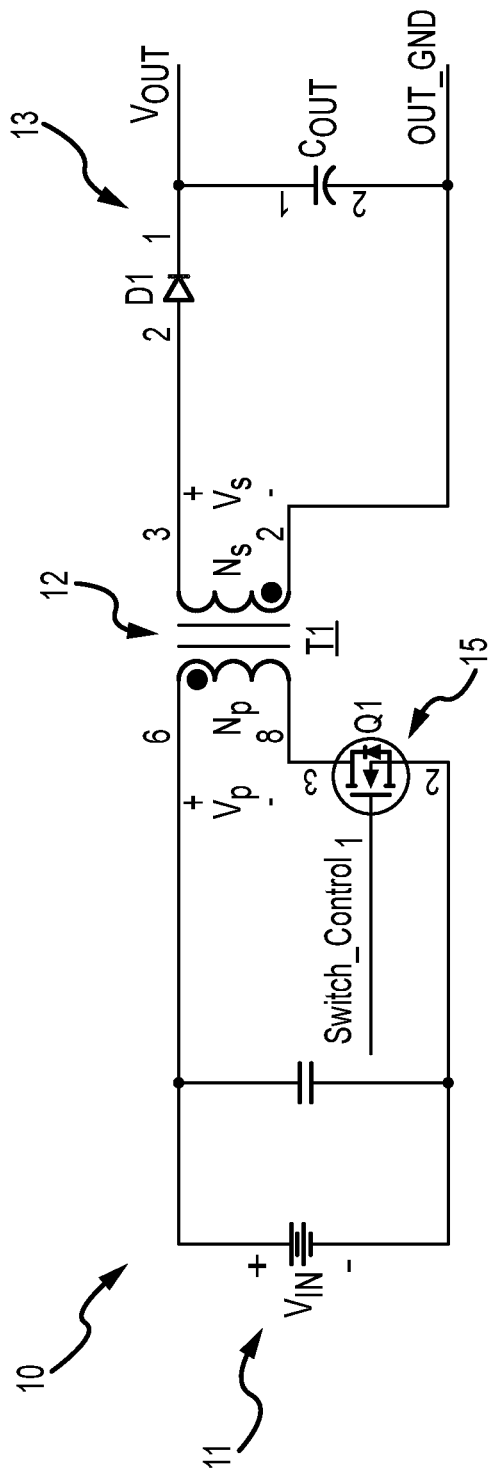
FIG. 1 shows an exemplary flyback converter 10.
Figure 2:
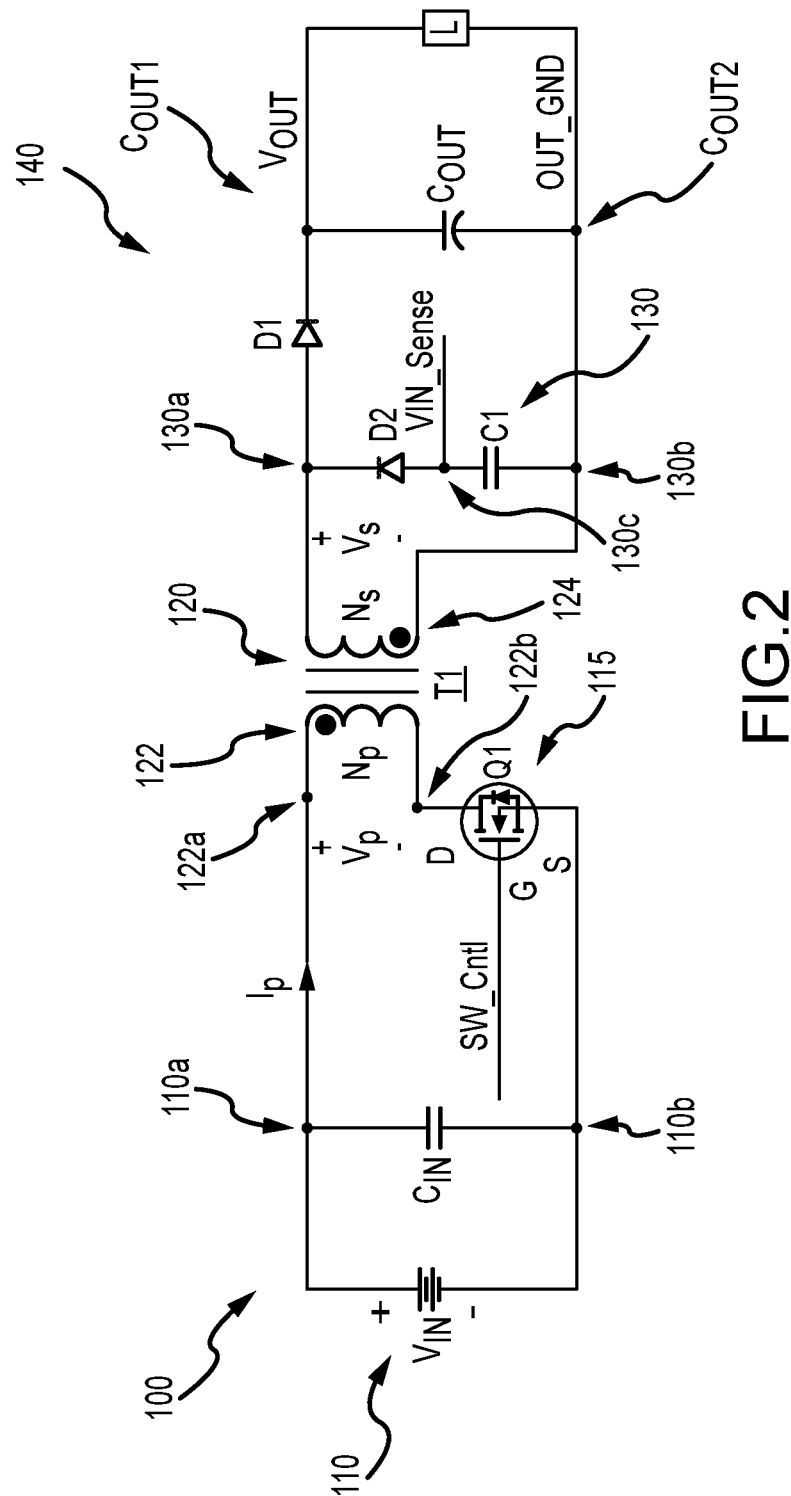
FIG. 2 shows an electronics 100 configured to determine an input voltage to a galvanic isolation point.
Figure 3:
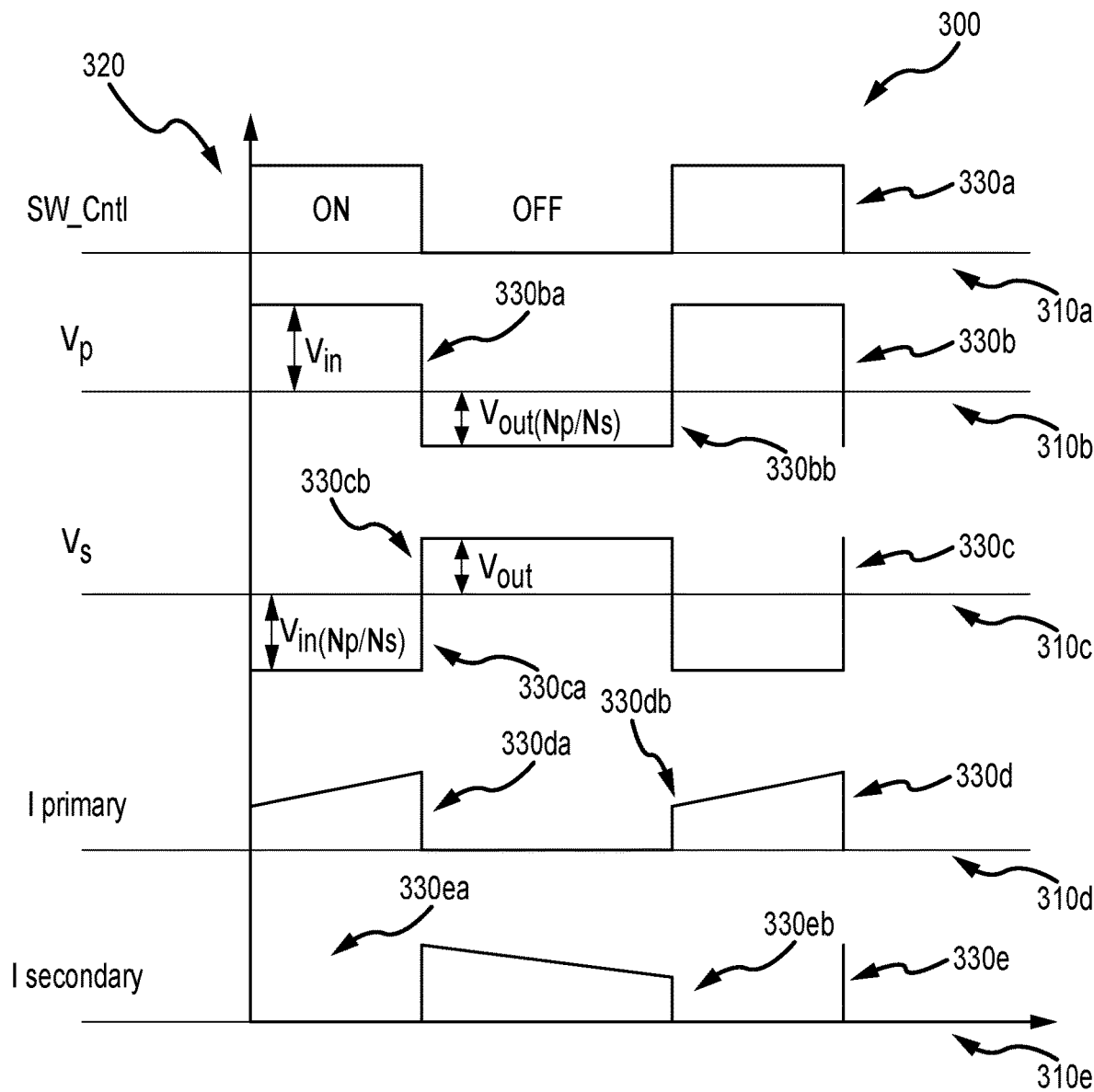
FIG. 3 shows a graph 300 illustrating various electrical values and states in an electronics configured to determine an input voltage to a galvanic isolation point of the electronics.
Figure 4:
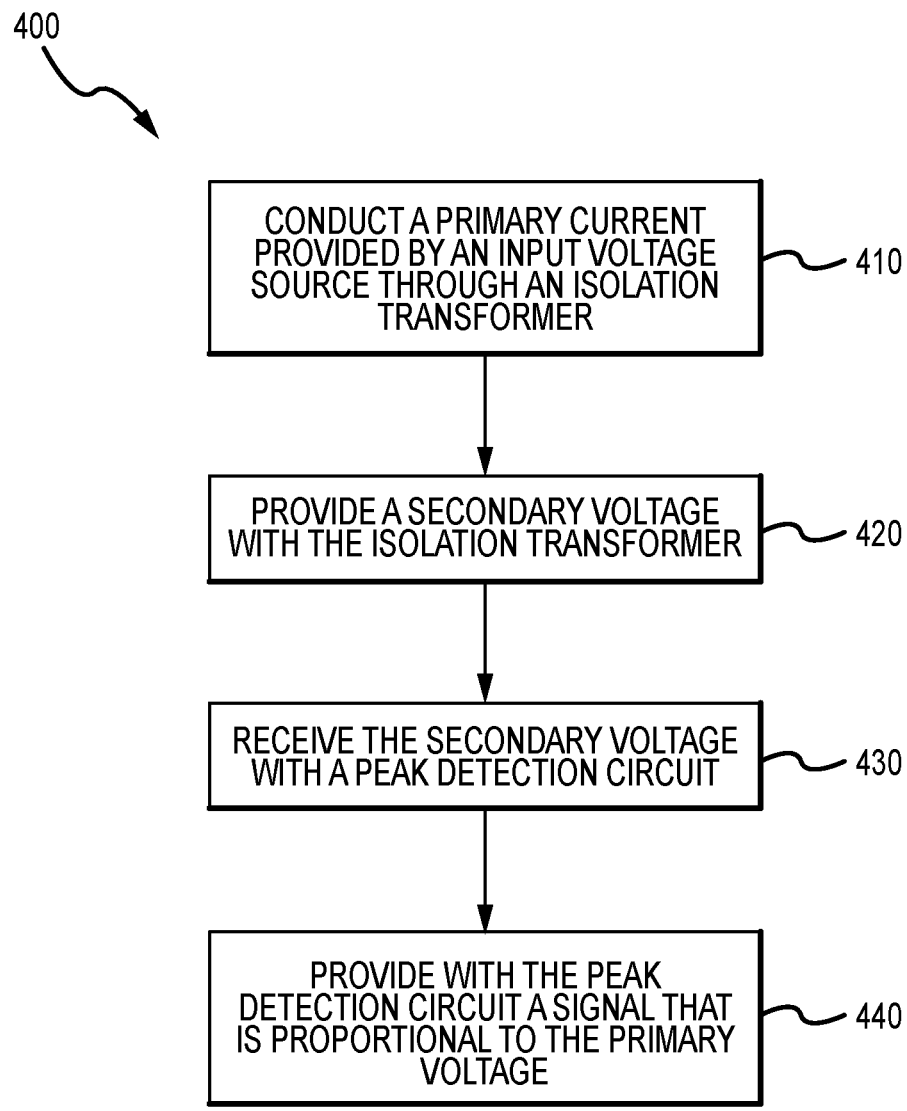
FIG. 4 shows a method 400 for determining an input voltage to a galvanic isolation point.

FIGS. 2-4 and the following description depict specific examples to teach those skilled in the art how to make and use the best mode of embodiments of electronics and methods that can determine an input to a galvanic isolation point. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form electronics and methods that can determine an input to the galvanic isolation point. As a result, the embodiments described below are not limited to the specific examples described below, but only by the claims and their equivalents.

FIG. 2 shows an electronics 100 including a galvanic isolation point. As shown in FIG. 2, the electronics 100 includes an input voltage source 110 that is coupled to an isolation transformer 120. The isolation transformer 120 is the galvanic isolation point of the electronics 100. A peak detection circuit 130 is coupled to the isolation transformer 120. A switch 115 is coupled to the isolation transformer 120 and is configured to selectively conduct a current based on a switch control signal SW_Cntl. Also shown is a rectifier circuit 140 that is coupled to the isolation transformer 120. The topology of the electronics 100 is a flyback converter, although the peak detection circuit 130 and rectifier circuit 140 may be employed in other topologies, such as a flybuck converter.

The input voltage source 110 provides an input voltage Vin. The input voltage source 110 may provide a constant voltage, such as a direct current (DC) voltage, to the isolation transformer 120. The input voltage source 110 may be in a non-isolated side of a galvanic isolation point. As a result, the input voltage Vin may include noise, transients, high voltages, or the like. The input voltage source 110 may be any suitable source, such as a two-wire bus, an external power supply, a battery or power supply in the electronics 100, etc. The input voltage source 110 has a first input voltage source terminal 110a and a second input voltage source terminal 110b.

The switch 115 is shown as being comprised of a metal-oxide semiconductor field effect transistor (MOSFET), although any suitable switch may be employed. As shown, the MOSFET includes a gate G, drain D, and source S terminals. The switch 115 is connected to the second input voltage source terminal 110b. The switch 115 is configured to receive the switch-control signal SW_Cntl. Where the switch 115 is comprised of the MOSFET shown in FIG. 2, the source S is electrically connected to the second input voltage source terminal 110b and the gate G receives the switch-control signal.

The isolation transformer 120 includes a primary coil 122 and a secondary coil 124. The isolation transformer 120 may be any suitable configuration and is not necessarily limited to transformers. For example, the isolation transformer 120 may be comprised of coupled inductors. As shown, the primary coil 122 is comprised of an inductor that has a first primary terminal 122a and a second primary terminal 122b. The first primary terminal 122a is electrically connected to the first input voltage source terminal 110a of the input voltage source 110. The second primary terminal 122b is electrically connected to the second input voltage source terminal 110b and the switch 115.

As shown, the primary coil 122 is denoted as having a primary voltage Vp and the secondary coil 124 is denoted as having a secondary voltage Vs. The primary coil 122 is shown as having Np number of turns and the secondary coil 124 is shown as having Ns number of turns. Accordingly, the primary voltage Vp may be proportional to the secondary voltage Vs by a secondary-to-primary turns ratio (Ns/Np) of the isolation transformer 120. However, any suitable relationship may be employed.

The isolation transformer 120 may conduct a primary current Ip that is provided by the input voltage source 110. That is, the input voltage source 110 may provide the input voltage Vin to the isolation transformer 120 and the switch 115 may selectively close a circuit between the first input voltage source terminal 110a and the second input voltage source terminal 110b. As a result, the primary voltage Vp is equal to the input voltage Vin, thereby causing the isolation transformer 120 to conduct the primary current Ip. Due to inductive coupling, the primary current Ip may induce the secondary voltage Vs on the secondary coil 124. The secondary voltage Vs may be provided to the peak detection circuit 130.

The peak detection circuit 130 is configured to receive the secondary voltage Vs. As shown in FIG. 2, the peak detection circuit 130 includes a first voltage determination terminal 130a and a second voltage determination terminal 130b. The first voltage determination terminal 130a is electrically connected to a first secondary terminal and the second voltage determination terminal 130b is electrically connected to a second secondary terminal. Accordingly, the secondary voltage Vs is applied to the first and second voltage determination terminals 130a, 130b of the peak detection circuit 130.

The peak detection circuit 130 may also be configured to provide a signal Vin_sense via a signal terminal 130c. The signal may be proportional to the primary voltage Vp. As shown in FIG. 2, for example, the signal Vin_sense is proportional to the primary voltage Vp due to the peak detection circuit 130 holding the secondary voltage Vs. For example, the signal Vin_sense provided by the peak detection circuit 130 may be a voltage value of the secondary voltage Vs. The voltage value of the secondary voltage Vs may be proportional to the primary voltage Vp by the secondary-to-primary turns ratio of the isolation transformer 120.

As shown in FIG. 2, the peak detection circuit 130 is comprised of a peak detect diode D2 in series with the peak hold capacitor C1. The peak detect diode D2 is electrically connected to the peak hold capacitor C1 at the signal terminal 130c. The peak detect diode D2 is arranged so as to allow a current to conduct from the peak hold capacitor C1 to the first voltage determination terminal 130a. The peak detect diode D2 is also arranged to prevent current from conducting from the first voltage determination terminal 130a to the peak hold capacitor C1.

As a result, when the secondary voltage Vs is negative, where the first voltage determination terminal 130a is a negative terminal and the second voltage determination terminal 130b is a positive terminal, the peak detect diode D2 can allow current to flow from the peak hold capacitor C1 to the first voltage determination terminal 130a. This may allow the peak hold capacitor C1 to be charged to a voltage value of the secondary voltage Vs.

When the secondary voltage Vs is positive, where the first voltage determination terminal 130a is a positive terminal and the second voltage determination terminal 130b is a negative terminal, then the peak detect diode D2 prevents current flow from the first voltage determination terminal 130a to the peak hold capacitor C1. This allows the peak hold capacitor C1 to hold the voltage value of the secondary voltage Vs. That is, the peak hold capacitor C1 is not discharged. Accordingly, the signal Vin_sense is still provided.

As discussed above, the topology of the electronics 100 may be a flyback converter, although the peak detection circuit 130 and/or rectifier circuit 140 may be employed in other topologies, such as a flybuck converter. In a flybuck converter, output voltage of the "buck" winding may need to be subtracted off a signal provided by the peak detect circuit to derive the input voltage. The peak detection circuit 130 may be used in any topology where the input voltage has an amplitude that is discernable at the output side winding of an isolation transformer.

The rectifier circuit 140 is configured to provide an output voltage Vout that, for example, may be a substantially constant DC value. As shown in FIG. 2, the rectifier circuit 140 may receive the secondary voltage Vs from the isolation transformer 120 and provide the output voltage Vout. As is discussed above and explained in more detail in the following with reference to FIG. 3, the secondary voltage Vs may have a negative voltage value or a positive voltage value. When the secondary voltage Vs has a positive voltage value, the rectifier circuit 140 can provide the secondary voltage Vs as the output voltage Vout. When the secondary voltage Vs has a negative voltage value, then the rectifier circuit 140 may not receive the secondary voltage Vs but may nevertheless provide the output voltage Vout. The output voltage Vout is provided to a load L.

As shown in FIG. 2, the rectifier circuit 140 is comprised of a rectifier diode D1 and an output capacitor Cout. The rectifier diode D1 is also electrically connected to an output capacitor Cout. The rectifier diode D1 is arranged to conduct current from the first voltage determination terminal 130a to the output capacitor Cout. The output capacitor Cout has a first output terminal Cout1 and a second output terminal Cout2. The first output terminal Cout1 is electrically connected to the rectifier diode D1. The second output terminal Cout2 is electrically connected to the second voltage determination terminal 130b. A voltage difference between the first output terminal Cout1 and the second output terminal Cout2 is shown as being the output voltage Vout.

The rectifier diode D1 may prevent a current flow from the first output terminal Cout1 to the first voltage determination terminal 130a. Accordingly, if the secondary voltage Vs has a voltage value that is less than a voltage value at the first output terminal Cout1, then the rectifier diode D1 may prevent the current flow from the output capacitor Cout to the isolation transformer 120. The rectifier diode D1 may also allow a current flow from the first voltage determination terminal 130a to the first output terminal Cout1 to, for example, charge the output capacitor Cout. That is, if the secondary voltage Vs has a voltage value that is greater than a voltage value at the first output terminal Cout1, then the rectifier diode D1 may allow the current flow to the first output terminal Cout1.

As a result, the output voltage Vout may be substantially constant at a voltage value that is approximately equal to the voltage value of the secondary voltage Vs that causes the rectifier diode D1 to allow the current flow to the first output terminal Cout1. The output voltage Vout remains substantially constant even though the peak detection circuit 130 is providing the signal at the signal terminal 130c that is proportional to the input voltage Vin. That is, the various electrical values and states in the electronics allow the peak detection circuit 130 to determine the input voltage Vin while also being isolated from the input voltage source 110. The electrical values and states in an electronics are discussed in more detail in the following with reference to FIG. 3.

FIG. 3 shows a graph 300 illustrating various electrical values and states in an electronics configured to determine an input voltage to a galvanic isolation point of the electronics. As shown in FIG. 3, the graph 300 includes a first through fifth time axes 310a-310e and a state/value axis 320. The first through fifth time axes 310a-310e are in units of seconds, although any suitable unit may be employed. The state/value axis 320 is in units of volts, amps, or bit-state depending on which of the first through fifth time axes 310a-310e is being referenced. As shown in FIG. 3, the graph 300 includes a switch-control plot 330a, a primary voltage Vp plot 330b, a secondary voltage Vs plot 330c, a primary current Ip plot 330d, and a secondary current Is plot 330e.

The switch-control plot 330a is shown as being comprised of an "on" or an "off" state. The switch-control plot 330a may represent the switch-control signal that is provided to the switch 115 described with reference to FIG. 2. As can be appreciated, the switch-control plot 330a alternates between the "on" and the "off" state in a periodic manner. The frequency of the switch-control plot 330a may be, for example, 100 kHz to 200 kHz, although any suitable frequency or frequencies may be employed. Also, any suitable periods or other ways of controlling the switch 115 or the primary current Ip shown in FIG. 2 may be employed.

The primary voltage Vp plot 330b is shown as being comprised of a first voltage value 330ba and a second voltage value 330bb. The first voltage value 330ba is shown as being equal to an input voltage Vin, which may be provided by the input voltage source 110 shown in FIG. 2. As can be appreciated, alternative first voltage values may be employed, such as, for example, where there are additional components between an input voltage source and an isolation transformer.

The secondary voltage Vs plot 330c is shown as being comprised of a first voltage value 330ca and a second voltage value 330cb. The first voltage value 330ca is shown as being equal to −Vin(Ns/Np). That is, the first voltage value 330ca is proportional to the input voltage Vin by −Ns/Np, although any suitable relationship may be employed, such as turns ratios associated with multiple winding transformers, center tap transformers, ratios associated with coupled inductors, etc. The second voltage value 330cb is shown as being equal to an output voltage Vout. That is, the second voltage value 330cb is the output voltage Vout due to, using FIG. 2 as an example, the rectifier diode D1 allowing current flow to the output capacitor Cout.

The primary current Ip plot 330d is shown as being comprised of a first current value 330da and second current value 330db. The first current value 330da is shown as having a positive and increasing value. The second current value 330db is shown as being zero. The first current value 330da may be positive due to, for example, the switch 115 being closed, thereby closing the circuit to the input voltage source 110. This allows the primary current Ip to flow through the isolation transformer 120. The second current value 330db may be zero because the switch 115 is open, thereby preventing current flow from the input voltage source 110.

The secondary current Is plot 330e is shown as being comprised of a first current value 330ea and a second current value 330eb. The first current value 330ea is shown as being zero. The second current value 330eb is shown as having a positive and decreasing value. The first current value 330ea may be zero due to the rectifier diode D1 preventing a current flow from the first output terminal Cout1 to the isolation transformer 120. The second current value 330eb may be positive due to the rectifier diode D1 allowing current flow from the isolation transformer 120 to the first output terminal Cout1.

Turning to the peak detection circuit 130, the peak detect diode D2 allows a current flow from the peak hold capacitor C1 when the secondary voltage Vs is at a voltage value less than a voltage value at the signal terminal 130c. That is, when the peak detect diode D2 is forward biased, current may flow to the first voltage determination terminal 130a. As a result, the voltage value at the signal terminal 130c may be equal to the voltage value of the secondary voltage Vs.

When the secondary voltage Vs has a value that is greater than a voltage value at the signal terminal 130c, then the peak detect diode D2 may prevent a current flow from the first voltage determination terminal 130a to the signal terminal 130c. That is, when the peak detect diode D2 is reversed biased, current flow may be prevented thereby preventing the peak hold capacitor C1 from being discharged. The peak hold capacitor C1 may therefore hold a voltage value, such as the voltage value of the secondary voltage Vs that may charge the peak hold capacitor C1 when the peak detect diode D2 is forward biased.

Accordingly, when considering the secondary voltage Vs plot 330c, it can be appreciated that the peak hold capacitor C1 may have a voltage value that is equal to a voltage value of −Vin(Ns/Np) when the peak hold diode D2 is forward biased. That is, when the switch-control plot 330a is "on" where the primary voltage Vp is equal to Vin, a voltage value of the signal terminal 130c may be equal to Vs, which is equal to −Vin(Ns/Np). It can also be appreciated that the peak hold capacitor C1 will maintain the voltage value of −Vin(Ns/Np) when the peak hold diode D2 is reverse-biased. Additionally, there may be a load resistance across the peak hold capacitor C1 (analogous to the load L across output capacitor Cout) which provides a path for discharge of the peak hold capacitor C1 at a relatively slow rate, such that the peak hold capacitor C1 may not indefinitely hold the largest negative voltage it has ever been exposed to.

As can also be appreciated, as the input voltage Vin decreases over time, the magnitude of the voltage value of a voltage of the peak hold capacitor C1 may correspondingly decrease. By way of example, the peak hold capacitor C1 may be charged to a first voltage value of −Vin1(Ns/Np) during a first "on" state. If the voltage value of the input voltage Vin is decreasing over time, then the secondary voltage Vs may be at a second voltage value of −Vin2(Ns/Np) that is more positive or less negative than the first voltage value of −Vin1 (Ns/Np). Accordingly, the voltage value of the signal terminal 130c may be at the second voltage value of −Vin2(Ns/Np).

Therefore, the signal provided by the signal terminal 130c may be proportional with the input voltage Vin over time. This allows, for example, the electronics 100 to determine the input voltage Vin over time even though the signal terminal 130c is isolated from the input voltage source 110. Additionally, the signal is provided using a single galvanic point, rather than a separate galvanic point. This reduces the board space requirement over the prior art. As can be appreciated, an electronics, such as the electronics 100 described in the foregoing, may execute a method to provide the signal. An exemplary method is described in the following with reference to FIG. 4.

FIG. 4 shows a method 400 for determining an input voltage to a galvanic isolation point. As shown in FIG. 4, the method 400 conducts a primary current provided by an input voltage source through an isolation transformer in step 410. In step 420, the method 400 provides a secondary voltage with the isolation transformer. The secondary voltage may be proportional to a primary voltage induced by the primary current. In step 430, the method 400 receives the secondary voltage with a peak detection circuit. In step 440, the method 400, based on the secondary voltage, provides with the peak detection circuit a signal that is proportional to the primary voltage.

The method 400 may further comprise receiving with a rectifier circuit the secondary voltage and providing an output voltage or the secondary voltage to a load with a rectifier circuit. The output voltage may be provided when the secondary voltage is a negative value and the secondary voltage may be provided when the secondary voltage is a positive value. Providing to the load with the rectifier circuit the capacitor voltage when the secondary voltage is the positive value may comprise providing with a rectifier diode in the rectifier circuit in a series electrical connection with the isolation transformer by conducting a secondary current provided by the isolation transformer, and receiving with an output capacitor in a parallel electrical connection with the isolation transformer the secondary voltage when the rectifier diode is conducting the secondary current.

The method 400 may also further comprise preventing current flow with the rectifier diode when the secondary voltage is at the negative value. For example, as described above with reference to FIG. 3, the rectifier diode D1 may prevent a current flow from the first output terminal Cout1 to the first voltage determination terminal 130a. Accordingly, if the secondary voltage Vs has a voltage value that is less than a voltage value at the first output terminal Cout1, then the rectifier diode D1 may prevent the current flow from the output capacitor Cout to the isolation transformer 120.

The method 400 may also further comprise holding with the peak detection circuit a first voltage value of the secondary voltage when the secondary voltage is at a second voltage value that is greater than the first voltage value. For example, as explained above with reference to FIG. 2, when the secondary voltage Vs is negative, where the first voltage determination terminal 130a is a negative terminal and the second voltage determination terminal 130b is a positive terminal, the peak detect diode D2 allows current to flow from the peak hold capacitor C1 to the first voltage determination terminal 130a. This may allow the peak hold capacitor C1 to be charged to a voltage value of the secondary voltage Vs.

Accordingly, the method 400 may also further comprise providing a peak detect diode and a peak hold capacitor, and connecting the peak detect diode and the peak hold capacitor in series to comprise the peak detection circuit. The method 400 may also further comprise holding with the peak hold capacitor the first voltage value when the secondary voltage is at the second voltage value greater than the first voltage value and configuring the peak detect diode to conduct current when the second voltage value is less than the first voltage value. The secondary voltage may be proportional to the primary voltage by a secondary-to-primary turns ratio of the isolation transformer.

The foregoing describes the electronics 100 and the method 400 that can determine the input voltage Vin to the galvanic isolation point. As discussed above, the peak detection circuit 130 can charge to and hold the secondary voltage Vs when the secondary voltage Vs is proportional to the input voltage Vin. The peak detection circuit 130 can therefore provide the signal that is proportional to the input voltage Vin.

Because the peak detection circuit 130 is coupled to the secondary coil 124 and the input voltage source 110 is coupled to the primary coil 122, the peak detection circuit 130 is isolated. The peak detection circuit 130 is also isolated without using an additional galvanic isolation point in addition to the galvanic isolation point used to provide the output voltage Vout.

This technical solution solves the technical problem of using a single galvanic isolation point while also measuring the input voltage Vin to the galvanic isolation point, which can reduce the board space required to determine the input voltage Vin. This technical solution also solves the technical problem of measuring the input voltage Vin without coupling noise, transients, high voltages, or the like to the secondary coil 124, which provides the output voltage Vout. The output voltage Vout may therefore be provided without the noise, transients, high voltages, or the like, that may be present in the input voltage Vin.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other electronics and methods that determine an input voltage to a galvanic isolation point and not just to the embodiments described above and shown in the accompanying figures. Accordingly, the scope of the embodiments described above should be determined from the following claims.

I claim:

1. An electronics (100) configured to determine an input voltage to a galvanic isolation point of the electronics (100), the electronics (100) comprising:
   an isolation transformer (120) configured to:
      conduct a primary current (Ip) provided by an input voltage source (110); and
      provide a secondary voltage (Vs), the secondary voltage (Vs) being proportional to a primary voltage (Vp) induced by the primary current (Ip); and
   a peak detection circuit (130) coupled to the isolation transformer (120), the peak detection circuit (130) being configured to receive the secondary voltage (Vs) at a first secondary terminal end of a secondary winding connected to a first terminal of a load (L) and a second secondary terminal end of the secondary winding connected to a second terminal of the load (L) and, based on the secondary voltage (Vs), provide a signal that is proportional to the primary voltage (Vp) due to the peak detection circuit (130) holding the secondary voltage (Vs).

2. The electronics (100) of claim 1, further comprising a rectifier circuit (140) coupled to the isolation transformer (120), the rectifier circuit (140) being configured to receive the secondary voltage (Vs) and provide to the load (L):
- a capacitor voltage when the secondary voltage (Vs) is at a negative value; and
- the secondary voltage (Vs) when the secondary voltage (Vs) is a positive value.

3. The electronics (100) of claim 2, wherein the rectifier circuit (140) is comprised of:
- a rectifier diode (D1) in a series electrical connection with the isolation transformer (120) and configured to provide the secondary voltage (Vs) to the load (L) when the secondary voltage (Vs) is the positive value by conducting a secondary current (Is) provided by the isolation transformer (120); and
- an output capacitor (Cout) in a parallel electrical connection with the isolation transformer (120), the output capacitor (Cout) being configured to receive the secondary voltage (Vs) when the rectifier diode (D1) is conducting the secondary current (Is).

4. The electronics (100) of claim 3, wherein the rectifier diode (D1) is further configured to prevent a current flow when the secondary voltage (Vs) is at the negative value.

5. The electronics (100) of claim 1, wherein the peak detection circuit (130) is further configured to hold a first voltage value of the secondary voltage (Vs) when the secondary voltage (Vs) is at a second voltage value that is greater than the first voltage value.

6. The electronics (100) of claim 5, wherein the peak detection circuit (130) is comprised of a peak detect diode (D2) in a series electrical connection with a peak hold capacitor (C1), the peak detection circuit (130) being in a parallel electrical connection with the isolation transformer (120).

7. The electronics (100) of claim 6, wherein:
- the peak hold capacitor (C1) is configured to hold the first voltage value of the secondary voltage (Vs) when the secondary voltage (Vs) is at the second voltage value that is greater than the first voltage value; and
- the peak detect diode (D2) is configured to conduct a current when the second voltage value of the secondary voltage (Vs) is less than the first voltage value.

8. The electronics (100) of claim 1, wherein the secondary voltage (Vs) is proportional to the primary voltage (Vp) by a secondary-to-primary turns ratio (Ns/Np) of the isolation transformer (120).

9. A method for determining an input voltage to a galvanic isolation point, the method comprising:
- conducting a primary current provided by an input voltage source through an isolation transformer;
- providing a secondary voltage with the isolation transformer, the secondary voltage being proportional to a primary voltage induced by the primary current;
- receiving the secondary voltage with a peak detection circuit at a first secondary terminal end of a secondary winding connected to a first terminal of a load and a second secondary terminal end of the secondary winding connected to a second terminal of the load; and
- based on the secondary voltage, providing with the peak detection circuit a signal that is proportional to the primary voltage due to the peak detection circuit holding the secondary voltage.

10. The method of claim 9, further comprising receiving with a rectifier circuit the secondary voltage and providing to the load with the rectifier circuit:
- a capacitor voltage when the secondary voltage is a negative value; and
- the secondary voltage when the secondary voltage is a positive value.

11. The method of claim 10, wherein providing to the load with the rectifier circuit the capacitor voltage when the secondary voltage is the positive value comprises:
- providing with a rectifier diode in the rectifier circuit in a series electrical connection with the isolation transformer by conducting a secondary current provided by the isolation transformer; and
- receiving with an output capacitor in a parallel electrical connection with the isolation transformer the secondary voltage when the rectifier diode is conducting the secondary current.

12. The method of claim 11, further comprising preventing current flow with the rectifier diode when the secondary voltage is at the negative value.

13. The method of claim 9, further comprising holding with the peak detection circuit a first voltage value of the secondary voltage when the secondary voltage is at a second voltage value that is greater than the first voltage value.

14. The method of claim 9, further comprising providing a peak detect diode and a peak hold capacitor, and connecting the peak detect diode and the peak hold capacitor in series to comprise the peak detection circuit.

15. The method of claim 14, further comprising holding with the peak hold capacitor the first voltage value when the secondary voltage is at the second voltage value greater than the first voltage value and configuring the peak detect diode to conduct current when the second voltage value is less than the first voltage value.

16. The method of claim 15, wherein the secondary voltage is proportional to the primary voltage by a secondary-to-primary turns ratio of the isolation transformer.

* * * * *